United States Patent
Lee et al.

(10) Patent No.: US 7,349,055 B2
(45) Date of Patent: Mar. 25, 2008

(54) LINE ON GLASS TYPE LIQUID CRYSTAL DISPLAY DEVICE AND METHOD OF FABRICATING THE SAME

(75) Inventors: Su Woong Lee, Kyoungsangbuk-do (KR); Sang Yoon Paik, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 274 days.

(21) Appl. No.: 10/875,723

(22) Filed: Jun. 25, 2004

(65) Prior Publication Data

US 2004/0263758 A1    Dec. 30, 2004

(30) Foreign Application Priority Data

Jun. 30, 2003   (KR) ...................... 10-2003-0043809

(51) Int. Cl.
*G02F 1/1345*   (2006.01)
(52) U.S. Cl. ...................... 349/152; 349/149; 349/150; 349/151
(58) Field of Classification Search ........ 349/149–152, 349/50
See application file for complete search history.

(56) References Cited

U.S. PATENT DOCUMENTS

| 6,633,361    | B1 * | 10/2003 | Fujita ......................... 349/152 |
| 2001/0046022 | A1 * | 11/2001 | Moon et al. ................. 349/150 |
| 2002/0044242 | A1 * | 4/2002  | Kim ............................ 349/139 |

* cited by examiner

*Primary Examiner*—David Nelms
*Assistant Examiner*—Lucy Chien
(74) *Attorney, Agent, or Firm*—Morgan, Lewis & Bockius LLP

(57) ABSTRACT

A liquid crystal display device and methodology of fabricating the same includes a picture display part provided on a substrate; a tape carrier package mounted with an integrated circuit to drive the picture display part, the tape carrier package having first pads attached to the substrate; signal lines provided on the substrate to apply signals to the tape carrier package; and second pads having a larger width than the first pads, the second pads being provided on the substrate in such a manner to be connected to the signal lines, and the second pads being connected to the first pads.

10 Claims, 4 Drawing Sheets

LINE ON GLASS TYPE LIQUID CRYSTAL DISPLAY DEVICE AND METHOD OF FABRICATING THE SAME

The present application claims the benefit of the Korean Patent Application No. P2003-43809 filed in Korea on Jun. 30, 2003, which is hereby incorporated by reference.

BACKGROUND OF THE INVENTION

1. Field of the Invention

The present invention relates to a liquid crystal display device and a method of fabricating the same, and more particularly, to a line on glass (LOG) type liquid crystal display device and a method of fabricating the same to lower a resistance of a LOG-type pad and to facilitate the carrying out of an associated alignment process.

2. Discussion of the Related Art

In general, a liquid crystal display (LCD) device displays images by individually supplying data signals to liquid crystal cells arranged in a matrix configuration and controlling light transmittance of the liquid crystal cells. The liquid crystal has a dielectric anisotropy that utilizes an electric field to display a picture. The LCD includes a liquid crystal display panel including the liquid crystal cell matrix arrangement and a driving circuit for driving the liquid crystal display panel.

The driving circuit includes a gate driver for driving gate lines of the liquid crystal display panel, a data driver for driving data lines of the liquid crystal display panel, a timing controller for controlling a driving timing of the gate driver and the data driver, and a power supply for supplying power signals required for driving the liquid crystal display panel and the driving circuit.

The data driver and the gate driver, separated into a plurality of integrated circuits (IC's), are typically manufactured in the shape of a standard chip. Each of these integrated drive IC's is mounted in an open IC area of a tape carrier package (TCP) or in a base film of the TCP by a chip on film (COF) system, and is electrically connected to the liquid crystal display panel by a tape automated bonding (TAB) system. Alternatively, the drive IC may be mounted directly on the liquid crystal display panel by a chip on glass (COG) system. The timing controller and the power supply are also typically manufactured into the shape of a standard chip to be mounted onto a main printed circuit board (PCB).

The drive IC's connected to the liquid crystal display panel by the TCP are connected, via a flexible printed circuit (FPC) and a sub-PCB, to the timing controller and the power supply on the main PCB. More specifically, the data drive IC's receive data control signals and pixel data from the timing controller mounted onto the main PCB and power signals from the power supply via the FPC and the data PCB. The gate drive IC's receive gate control signals from the timing controller mounted onto the main PCB and power signals from the power supply mounted on the main PCB by way of the PCB.

The drive IC's mounted onto the liquid crystal display panel by the COG system receive control signals from the timing controller mounted on the main PCB and power signals from the power supply mounted on the main PCB through the FPC and line on glass (LOG) type signal lines provided at the liquid crystal display panel.

In recent times, even when the drive IC's are connected, via the TCP, to the liquid crystal display panel, LCD arrangements have begun to adopt the LOG-type signal lines to eliminate the inclusion of an unnecessary PCB, thereby reducing the device thickness to result in an overall thinner device. In particular, the gate PCB, which delivers a relatively small number of signals, is removed from the LCD device arrangement. Accordingly, signal lines for applying gate control signals and power signals to the gate drive IC's are provided on the liquid crystal display panel in a LOG type arrangement. As a result, the gate drive IC's mounted in the gate TCP receive the control signals from the timing controller and the power signals from the power supply by way of the main PCB, the FPC, the data PCB, the data TCP, the LOG-type signal lines and the gate TCP in turn.

More specifically, FIG. 1 shows a related art line on glass (LOG) type liquid crystal display arrangement. As shown in FIG. 1, a LOG-type LCD, in which the gate PCB has been removed, includes a main PCB 20 provided with a timing controller 22 and a power supply 24, a data PCB 16 connected, via a FPC 18, to the main PCB 20, a data TCP 12 mounted with a data drive IC 14 and connected between the data PCB 16 and a liquid crystal display panel 6, and a gate TCP 8 mounted with a gate drive IC 10 and connected to the liquid crystal display panel 6.

In the liquid crystal display panel 6, a lower array substrate 2 is joined to an upper array substrate 4. Liquid crystal is injected between the lower and upper array substrates. This liquid crystal display panel 6 is provided with liquid crystal cells driven independently by thin film transistors for each area defined by intersections between gate lines GL and data lines DL. Each of the thin film transistors applies a pixel signal from the data line DL to the liquid crystal cell in response to a scanning signal from the gate line GL.

The data drive IC 14 is connected, via the data TCP 12 and data pads of the liquid crystal display panel, to the data lines DL. The data drive IC 14 converts digital pixel data into analog pixel signals to apply them to the data lines DL. In this regard, the data drive IC 14 receives data control signals, pixel data signals and power signals from the timing controller 22 and the power supply 24 mounted onto the main PCB 20 by way of the data PCB 16 and the FPC 18.

The gate drive IC 10 is connected, via the gate TCP 8 and gate pads of the liquid crystal display panel 6, to the gate lines GL. The gate drive IC 10 sequentially applies a scan signal to the gate lines GL so that the liquid crystal cells arranged in the matrix configuration can be selected line-by-line. The gate drive IC 10 applies a gate high voltage VGH scan signal when sequentially applying the scan signal to select a liquid crystal cell line. Further, the gate drive IC 10 applies a gate low voltage VGL to the remaining gate lines GL when the gate high voltage VGH has been supplied to a selected line.

Accordingly, the gate control signals and the power signals from the timing controller 22 and the power supply 24 on the main PCB 20 are applied, via the FPC 18 and the data PCB 16, to the data TCP 12. The gate control signals and the power signals supplied to the data TCP 12 are then applied, via a LOG-type signal line 26 provided at the edge area of the lower array substrate 2, to the gate TCP 8. The gate control signals and the power signals applied to the gate TCP 8 are supplied, via input terminals of the gate drive IC 10, into the gate drive IC 10. Further, the gate control signals and the power signals are output from the gate drive IC 10 via output terminals of the gate drive IC 10, and applied, via the gate TCP 8 and the LOG-type signal line 26, to a gate drive IC 10 mounted in the subsequent gate TCP 8.

The LOG-type signal line 26 typically includes signal lines for supplying direct current driving voltages from the power supply 24, such as a gate low voltage VGL, a gate high voltage VGH, a common voltage VCOM, a ground voltage GND and a base driving voltage VCC. Also supplied by the LOG-type signal lines are gate control signals from the timing controller 22, such as a gate start pulse GSP, a gate shift clock signal GSC and a gate enable signal GOE.

A first LOG pad 32 extended from one end of the related art LOG-type signal line 26 is connected to a first supply pad of the first data TCP 12 for supplying the gate driving signals, whereas a second LOG pad 38 extended from other end of the LOG-type signal line 26 is connected to a second supply pad of the gate TCP 8.

FIG. 2 is a detailed view of LOG pads for connecting to the TCPs shown in FIG. 1. As shown in FIG. 2, at least one dummy pad 40 is provided between the first and second LOG pads 32 and 38. The dummy pads 40 are provided to improve the adhesive force with respect to at least one of the gate TCP 8 and the data TCP 12.

Each of the first and second LOG pads 32 and 38 of the related art display panel has one input terminal and is formed in the shape of a stripe. In this arrangement, since a contact area between an input terminal of the first LOG pad 32 and an output terminal of the first supply pad and a contact area between an input terminal of the second LOG pad 38 and an output terminal of the second supply pad are small, the resultant contact resistance is relatively high. As a result, the resultant line resistance of the LOG-type signal line 26 connected with the first and second LOG pads 32 and 38 also is relatively high.

Moreover, a problem results in that, because the first and second LOG pads 32 and 38 have a relatively small width, it is not easy to align the first and second LOG pads with the first supply pad of the data TCP and the second supply pad of the gate TCP when the LOG pads are brought into contact with their respective supply pad.

SUMMARY OF THE INVENTION

Accordingly, the present invention is directed to a liquid crystal display device and a method of fabricating the same that substantially obviate one or more of the problems due to limitations and disadvantages of the related art.

An object of the present invention is to provide a line on glass (LOG) type liquid crystal display device and a method of fabricating the same which are adaptive for lowering a resistance of a LOG-type pad and easily carrying out an alignment process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a picture display part provided on a substrate; a tape carrier package mounted with an integrated circuit to drive the picture display part, the tape carrier package having first pads attached to the substrate; signal lines provided on the substrate to apply signals to the tape carrier package; and second pads having a larger width than the first pads, the second pads being provided on the substrate in such a manner to be connected to the signal lines, and the second pads being connected to the first pads.

In another aspect, a method of fabricating a liquid crystal display device in which a tape carrier package mounted integrated circuit is attachable to a substrate via first pads, includes providing signal lines for applying signals to the tape carrier package on the substrate; providing second pads having a larger width than the first pads of the tape carrier package, the second pads being connected to the signal lines on the substrate; and connecting the first pads to the second pads.

In another aspect, a liquid crystal display device includes a picture display part, including data lines and gate lines, provided on a substrate; a first tape carrier package mounted with a data drive integrated circuit to drive the data lines of the picture display part, the first tape carrier package having first supply pads attached to the substrate; a second tape carrier package mounted with a gate drive integrated circuit to drive the gate lines of the picture display part, the second tape carrier package having second supply pads attached to the substrate; signal lines provided on the substrate to apply signals between the first and second tape carrier packages; and signal line pads having a larger width than the first and second supply pads, the signal line pads being provided on the substrate in such a manner to be connected to the signal lines, and the first and second supply pads being connected to the signal line pads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
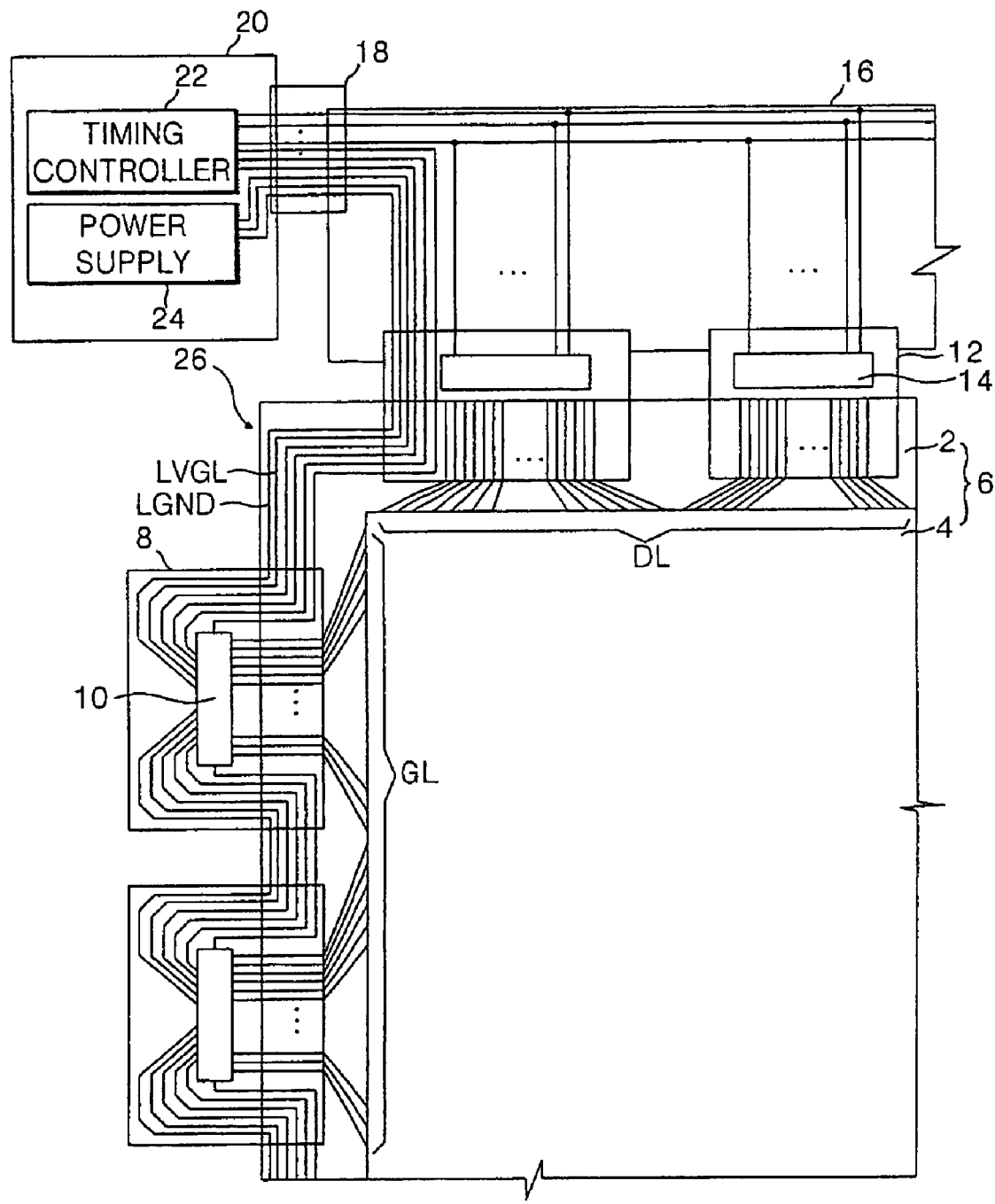
FIG. 1 shows a related art line on glass (LOG) type liquid crystal display arrangement.
Figure 2:
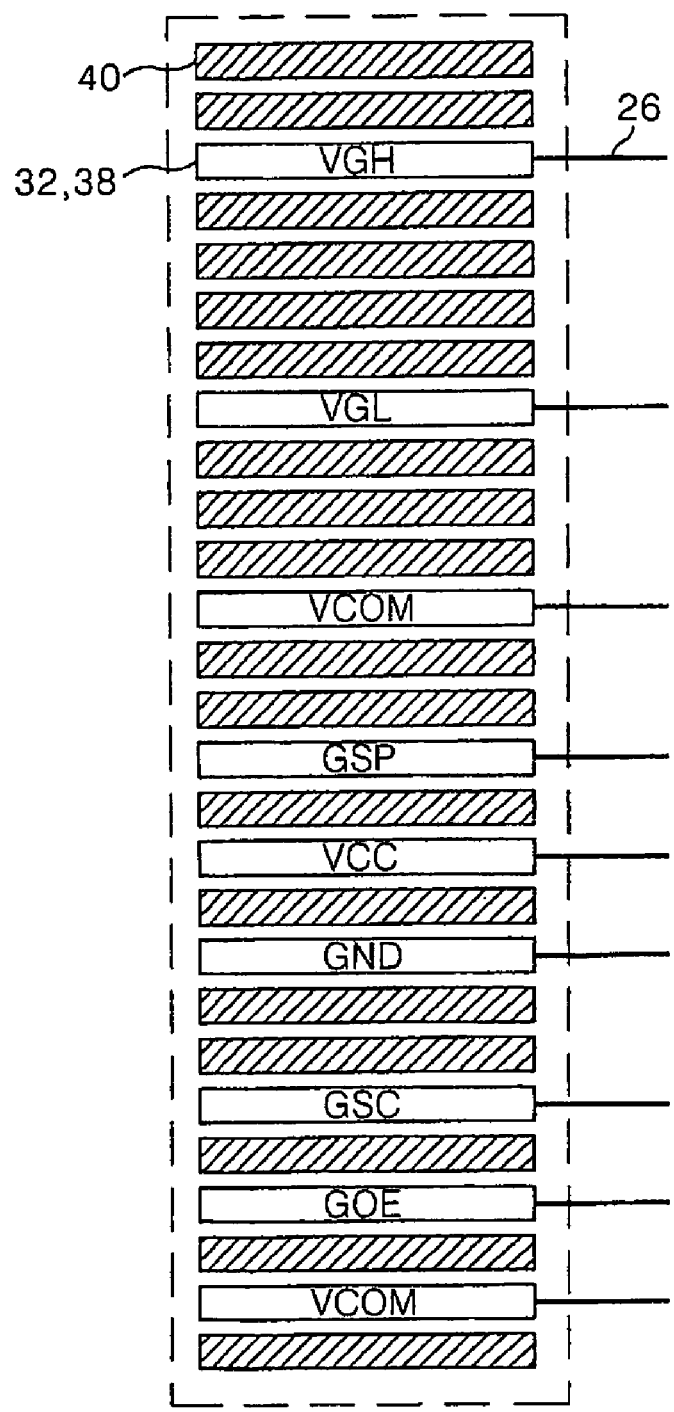
FIG. 2 is a detailed view of LOG pads for connecting to the TCPs shown in FIG. 1.
Figure 3:
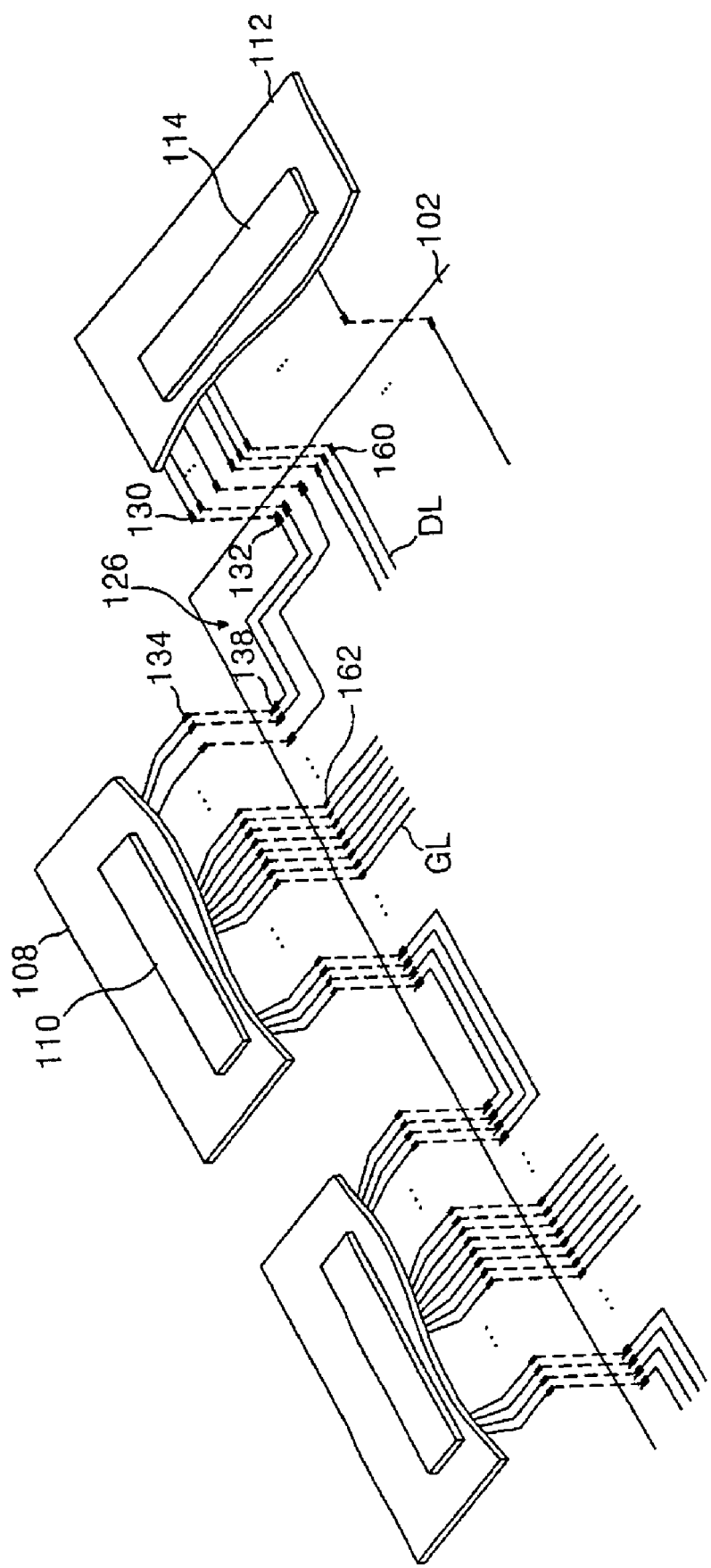
FIG. 3 is a perspective view showing a configuration of a line on glass (LOG) type liquid crystal display according to an embodiment of the present invention.
Figure 4:
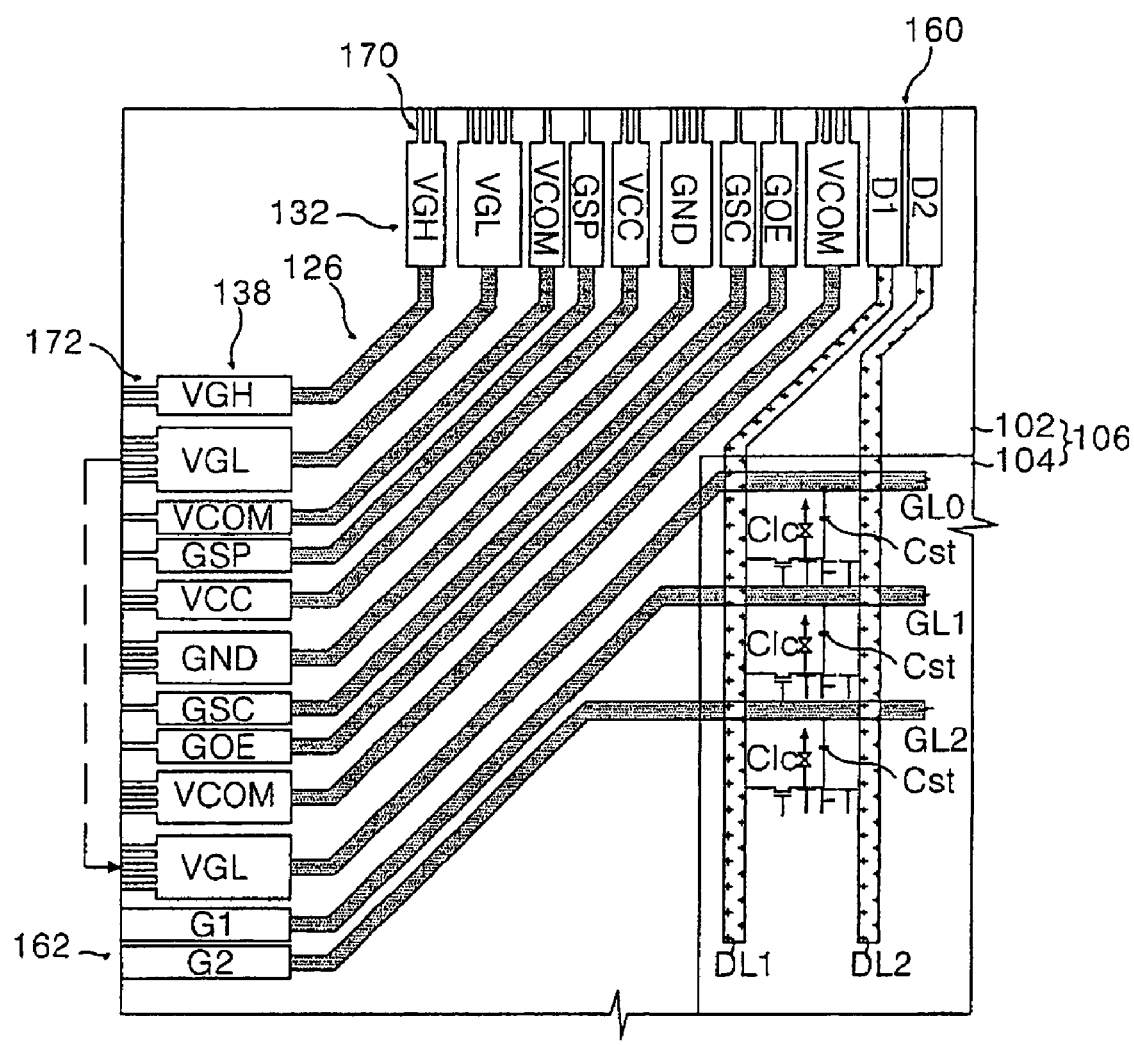
FIG. 4 is a detailed plan view of the liquid crystal display panel shown in FIG. 3.

FIG. 3 is a perspective view showing a configuration of a line on glass (LOG) type liquid crystal display according to an embodiment of the present invention. FIG. 4 is a detailed plan view of the liquid crystal display panel shown in FIG. 3. Referring to FIGS. 3 and 4, a LOG-type liquid crystal display according to an embodiment of the present invention includes a liquid crystal display (LCD) panel 106 having a liquid crystal cell matrix, a data TCP 112 having a data drive IC 114 mounted thereon to be connected to the LCD panel 106, and a gate TCP 108 having a gate drive IC 110 mounted thereon to be connected to the LCD panel 106.

The data drive IC 114 is connected, via the data TCP 112 and data pads 160 of the LCD panel 106, to the data lines DL. The data drive IC 114 converts digital pixel data into analog pixel signals to be applied to the data lines DL.

The gate drive IC 110 is connected, via the gate TCP 108 and gate pads 162 of the LCD panel 106, to the gate lines GL. The gate drive IC 110 sequentially applies a scan signal having a gate high voltage VGH to the gate lines GL so that the liquid crystal cells arranged in the matrix configuration can be selected line-by-line. Further, the gate drive IC 110 applies a gate low voltage VGL to the gate lines GL in the remaining interval excluding a time interval when the gate high voltage VGH has been supplied.

The LCD panel 106 includes a picture display part having a liquid crystal cell matrix, and a pad part located outside of the picture display part. The picture display part includes liquid crystal cells, defined between the gate lines GL and the data lines DL, to thereby display a picture. This picture display part includes a lower substrate 102 provided with a thin film transistor array along with the gate lines GL and the data lines DL, an upper substrate 104 provided with a color filter array, and a liquid crystal injected between the lower substrate 102 and the upper substrate 104.

The pad part is an outer area of the lower substrate 102 that does not overlap with the upper substrate 104. The data pads 160 extended from the data lines DL and the gate pads 162 extended from the gate lines GL are located at the pad part area. Further, at the outer area of the lower substrate 102, a plurality of LOG-type signal lines 126 for delivering gate driving signals to the gate drive IC 110 are positioned. The LOG-type signal lines 126 include signal lines for supplying direct current voltage signals from the power supply, such as a gate low voltage signal VGL, a gate high voltage signal VGH, a common voltage signal VCOM, a ground voltage signal GND and a supply voltage signal VCC. The LOG-type signal lines 126 include signal lines for also supplying gate control signals from the timing controller, such as a gate start pulse GSP, a gate shift clock signal GSC and a gate enable signal GOE.

First LOG pads 132 are extended from one end of the LOG-type signal lines 126. The first LOG pads 132 are connected to first supply pads 130 of the first data TCP 112 for supplying the gate driving signals. Second LOG pads 138 are extended from the other end of the LOG-type signal lines 126. The second LOG pads 138 are connected to second supply pads 134 of the gate TCP 108. Output pads of the data TCP 112 are connected to the data pads 160 extended from the data lines DL while output pads of the gate TCP 108 are connected to the gate pads 162 extended from the gate lines GL.

The LOG signal pads including each of the first and second LOG pads 132 and 138 are formed integral to the dummy pad adjacent thereto to result in each LOG signal pad having a larger area than those in the related art arrangements. In other words, each of the first and second LOG pads of the related art have a width similar to the first and second supply pads corresponding to them, respectively. On the other hand, each of the first and second LOG pads 132 and 138 according to embodiments of the present invention differ from the related art arrangements because they have a larger width than the first and second supply pads 130 and 134 corresponding to them.

By providing each of the first and second LOG pads 132 and 138 with a larger area than their corresponding first and second supply pads 130 and 134, their relative alignment margin region is advantageously widened. As a result, in the event that there is a misalignment between the liquid crystal display panel provided with the first and second LOG pads 132 and 138 and one or more of the TCPs provided with the first and second supply pads 130 and 134 respectively, the LOG pads 132 and 138 having a larger area than the respective supply pads increases the possibility for a proper contact area between the supply pads 130 and 134 and the LOG pads 132 and 138 even in the event of a misalignment between the two portions. As a result of this advantageous feature of this embodiment, contact difficulties between the supply pads 130 and 134 and the LOG pads 132 and 138 caused by such misalignment can be prevented.

Any of the first and second LOG pads 132 and 138 connected with the first and second supply pads of the driving TCPs, including the gate TCP 108 and the data TCP 112, respectively can have a plurality of input terminals 170 and 172, as shown in FIG. 4, for example. In particular, the LOG signal pads 132 and 138 for supplying the gate high voltage signal VGH, the gate low voltage signal VGL, the common voltage signal VCOM, the ground voltage signal GND and the supply voltage signal VCC each have at least two input terminals 170 and 172, as shown in FIG. 4. Moreover, the LOG signal pads 132 and 138 having at least one input terminal have a larger contact area with the supply pad than the related art signal pads having a single input terminal. In other words, a contact area of the plurality of input terminals of the first LOG pads 132 with respective output terminals of the first supply pads 130 connected to the first LOG pads 132 is widened in comparison to the related art arrangements, so that a contact resistance, which is inversely proportional to the area, can be lowered.

Also, a contact area of the plurality of input terminals of the second LOG pads 138 with respective output terminals of the second supply pads 134 connected to the second LOG pads 138 is widened in comparison to the related art arrangements, so that a contact resistance inversely proportional to the area can also be lowered. Moreover, areas of the first and second LOG pads 132 and 138 are widened in comparison to the related art arrangements, so that pad resistance thereof also can be reduced. As a result, a line resistance of the LOG-type signal line 126 connected with the first and second LOG pads 132 and 138 becomes relatively low.

As described above, according to embodiments of the present invention, each the LOG signal pads has a relatively wide area. Moreover, each of the LOG signal pads of embodiments of the present invention have at least one input terminal. Accordingly, a contact resistance between a LOG signal pad and its corresponding supply pad becomes relatively low. As a result, it is possible to reduce a line resistance of the LOG-type signal line connected to the LOG signal pad. Also, this arrangement results in the facilitation of making proper alignment of a supply pad with a LOG signal pad when they are connected together.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a picture display part provided on a substrate;
   a data tape carrier package mounted with a data driving integrated circuit to drive data lines of the picture display part, the data tape carrier package having first pads attached to the substrate;
   a gate tape carrier package mounted with a gate driving integrated circuit to drive gate lines of the picture display part, the gate tape carrier package having second pads attached to the substrate;

LOG lines provided on the substrate to electrically connect the data driving tape carrier package to the gate driving tape carrier package; and third pads having a larger width than the first and second pads, the third pads being provided on the substrate to connect to the LOG lines, and the third pads being connected to the first and second pads, wherein at least one of the third pads has at least two input terminals, and each of the first and second pads corresponding to the at least two input terminals has a single output terminal.

2. The liquid crystal display device according to claim 1, wherein the third pads include any one of:

a first LOG pad connected to the gate tape carrier package, and a second LOG pad connected to the data tape carrier package.

3. The liquid crystal display device according to claim 2, wherein the third pads are supplied with gate driving signals to drive the gate lines.

4. The liquid crystal display device according to claim 3, wherein the third pads are supplied with at least one of a gate low voltage, a gate high voltage, a common voltage, a ground voltage, and a supply voltage.

5. A method of fabricating a liquid crystal display device in which a data tape carrier package mounted with a data driving integrated circuit for driving data lines and having first pads attachable to a substrate and a gate tape carrier package mounted with a gate driving integrated circuit for driving gate lines and having second pads attachable to the substrate, said method comprising the steps of:

forming LOG lines on the substrate;

forming third pads having a larger width than the first and second pads of the data and gate tape carrier packages, respectively, the third pads being connected to the LOG lines on the substrate; and connecting the first and second pads to the third pads such that the LOG lines electrically connect the data tape carrier package to the gate tape carrier package, wherein at least one of the third pads has at least two input terminals, and each of the first and second cads corresponding to the at least two input terminals has a single output terminal.

6. The method according to claim 5, wherein providing the third pads includes:

forming a first LOG pad connected to the gate tape carrier package; and forming a second LOG pad connected to the data tape carrier package.

7. A liquid crystal display device, comprising:

a picture display part, including data lines and gate lines, provided on a substrate;

a data tape carrier package mounted with a data drive integrated circuit to drive the data lines of the picture display part, the first tape carrier package having first supply pads attached to the substrate;

a gate tape carrier package mounted with a gate drive integrated circuit to drive the gate lines of the picture display part, the gate tape carrier package having second supply pads attached to the substrate;

LOG lines provided on the substrate to apply signals between the data tape carrier package and the gate tape carrier package; and LOG line pads having a larger width than the first and second supply pads, the LOG line pads being provided on the substrate to connect to the LOG lines, and the first and second supply pads being connected to the LOG line pads, wherein at least one of the LOG line pads has at least two input terminals, and each of the first and second supply pads corresponding to the at least two input terminals has a single terminal.

8. The liquid crystal display device according to claim 7, wherein the LOG line pads are supplied with gate driving signals to drive the gate lines.

9. The liquid crystal display device according to claim 7, wherein the LOG line pads are supplied with at least one of a gate low voltage, a gate high voltage, a common voltage, a ground voltage, and a supply voltage.

10. A liquid crystal display device, comprising:

a picture display part having a plurality of data lines and a plurality of gate lines, and the picture display part being provided on a substrate;

a first tape carrier package mounted with a gate integrated circuit to drive the gate lines, the first tape carrier package including a plurality of output pads;

a second tape carrier package mounted with a data integrated circuit to drive the data lines, the second tape carrier package including a plurality of output pads; and a plurality of LOG lines, each having a first pad connected to the output pad of the first tape carrier package and a second pad connected to the output pad of the second tape carrier package, the LOG lines being provided on the substrate, wherein each of the first and second pads has a width that is larger than each of the output pad of the first and second tape carrier package, and each of the first and second pads has at least two input terminals, and each of the tape carrier package pads corresponding to the at least two input terminals has a signal output terminal.

* * * * *